Jan. 10, 1928.
J. H. WEBB
1,656,090
CUTTER BAR FOR MOWING MACHINES
Filed Oct. 28, 1925    2 Sheets-Sheet 1
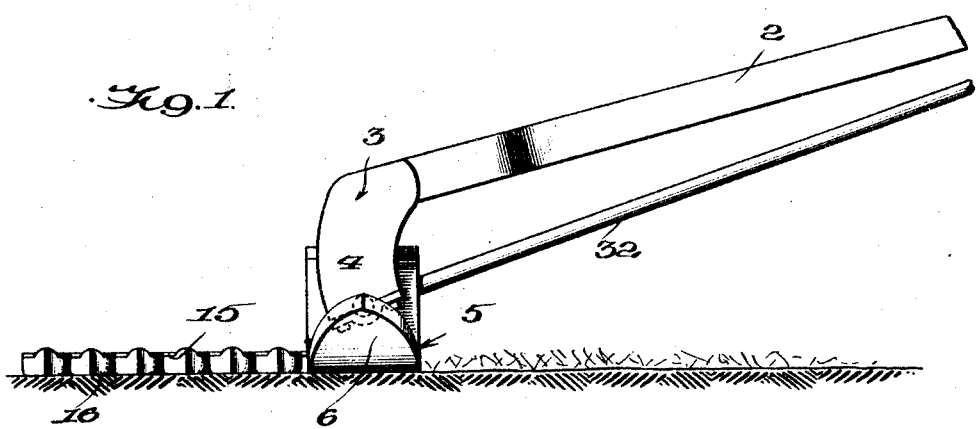
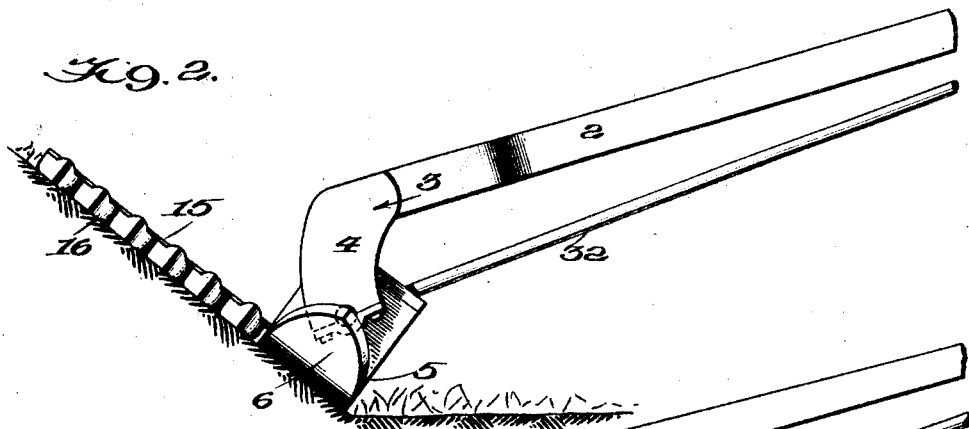
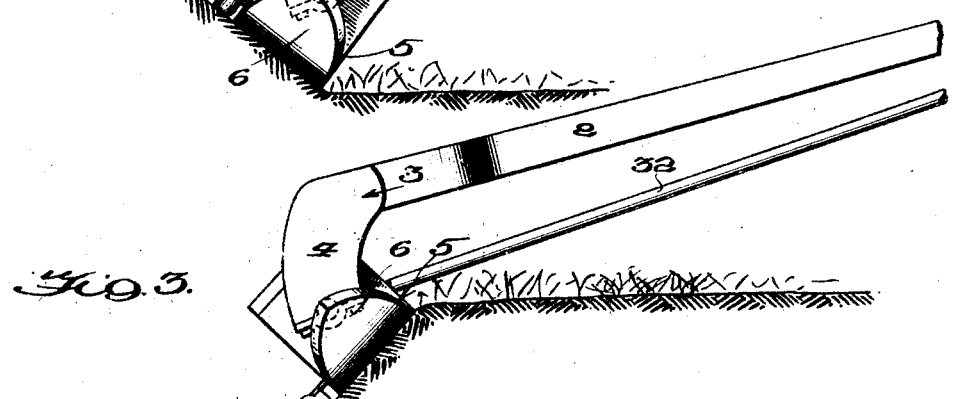
INVENTOR
J. H. Webb,
BY
ATTORNEYS Jan. 10, 1928.                                          1,656,090
                        J. H. WEBB
             CUTTER BAR FOR MOWING MACHINES
                Filed Oct. 28, 1925        2 Sheets-Sheet 2
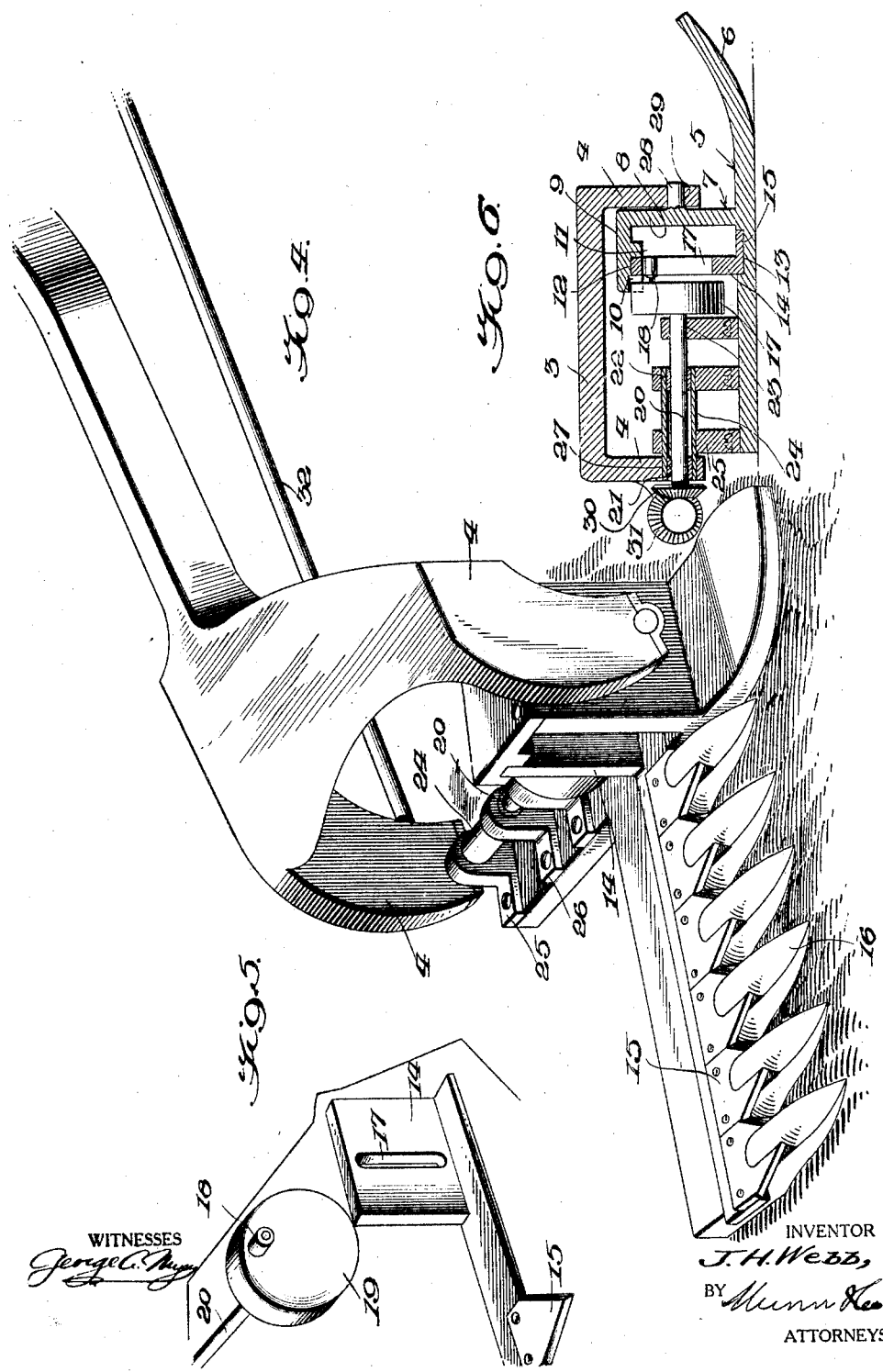
WITNESSES
                                            INVENTOR
                                            J. H. Webb,
                                         BY
                                            ATTORNEYS Patented Jan. 10, 1928.

1,656,090

UNITED STATES PATENT OFFICE.

JOHNATHAN H. WEBB, OF CHANDLER, ARIZONA.

CUTTER BAR FOR MOWING MACHINES.

Application filed October 28, 1925. Serial No. 65,390.

This invention relates in general to an improvement in mowing machines and more particularly to an improvement in cutter bars therefor.

The object of the invention is to provide an improvement of this character wherein the cutter bar is mounted so as to be adapted to effectively carry out its functions irrespective of the inclination of the ground on which the vegetation is to be cut, the cutter bar being positionable either horizontally or in an upwardly or downwardly inclined position.

A still further object resides in the provision of a machine of this character wherein the pitman is eliminated and the cutter bar driven in a novel and efficient manner.

A still further object resides in the provision of a machine having these advantages and capacities and which is of simple and durable construction, reliable and effective in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a fragmentary perspective view in front elevation showing one embodiment of the invention and illustrating the cutter bar in a horizontal position, Figure 2 is a similar view showing the cutter bar in an upwardly inclined position, Figure 3 is another similar view showing the cutter bar in a downwardly inclined position, Figure 4 is a fragmentary perspective view of the invention shown in Figs. 1 and 3, Figure 5 is a fragmentary group view in perspective showing the means employed for converting the rotary motion of the driven shaft into the reciprocatory movement of the cutter bar, and Figure 6 is a view partly in vertical section and partly in elevation illustrating the means for pivotally supporting the shoe on the hanger and the means for mounting the driven shaft and associated parts.

Referring to the drawings the numeral 1 designates generally a portion of a conventional mowing machine on which a hanger 2 is suspended. The hanger 2 is formed at its outer end with a hanger bracket 3 having downwardly extending spaced arms 4. A ground-engaging shoe 5 is provided and has its forward end upwardly turned, as at 6. Adjacent its forward end the shoe 5 is provided with an integral bracket, designated generally at 7, and having a vertical portion 8 integral with or suitably connected to the shoe 5 and a horizontal upper portion 9 integral or suitably connected to the vertical portion 8. On the underside of the horizontal portion 9 lugs 10 and 11 are provided and define a guide 12. The guide 12 coacts with a similar guide 13 in the shoe 5 to constrain the actuating block 14 of a cutter bar 15 to rectilinear movement. The cutter bar 15 is slidably fitted in the guard finger 16 in the usual way.

The actuating plate 14 is provided with a vertical slot 17 in which a crank pin or roller 18 of a crank disc 19 is operatively fitted. The crank disc 19 is fixed on one end of a driven shaft 20 rotatably fitted in bearings 21, 22, and 23 provided therefor in the shoe 5. The bearings 21 and 22 are provided in a bushing 24 which is mounted in bearing blocks 25 and 26 fastened to the cutter shoe 5. The bushing 24 projects beyond the bearing block 25 and the projecting portion provides a trunnion which is rotatably fitted in a bearing 27 formed in one of the arms 4 of the hanger bracket 3. An alined trunnion 28 is provided on the vertical portion 8 of the bracket 7 and is rotatably fitted in an alined bearing 29 formed in the other arm 4. By means of these trunnions and the bearings the shoe may be rocked or tilted relative to the hanger and yet the cutter bar may be driven in any angular position since the axis of tilt or swing of the cutter bar coincides with the axis of the driven shaft 20. The driven shaft 20 projects beyond the bearing 21 and the projecting portion of this shaft has a beveled gear 30 fixed thereto. The beveled gear 30 meshes with a similar beveled gear 31 fixed to the lower end of an inclined driving shaft 32 actuated by suitable means, not shown, on the mowing machine 1.

I claim:—

1. In a mowing machine, a hanger having a hanger bracket at its lower end including spaced downwardly extending bars formed with bearings, a shoe having a bracket provided with a trunnion fitted in one of the bearings and an overhanging laterally extending guide member at its upper end, a plurality of spaced bearing blocks mounted on the shoe, a bushing secured in a plurality of said blocks to adapt it to withstand strain, said bushing having a projecting portion constituting a trunnion rotatably fitted in the bearing of the other arm of the hanger bracket, bearings in said bushing, a driven shaft rotatably fitted in the bearings of the bushing and in the bearing of the remaining bearing block, a cutter bar carried by the shoe, and having an upstanding member mounted to slide in said overhanging guide member, means for rotating the driven shaft in any angular position of the shoe, and means for reciprocating the cutter bar from the driven shaft.

2. In a mowing machine, a hanger having a hanger bracket at its lower end including spaced downwardly extending bars formed with bearings, a shoe having a bracket provided with a trunnion fitted in one of the bearings, a plurality of spaced bearing blocks mounted on the shoe, a bushing secured in a plurality of said bearing blocks and having a projecting portion constituting a trunnion rotatably fitted in the bearing of the other arm, bearings in said bushing, a driven shaft rotatably fitted in the bearings of the bushing and in the bearing of the remaining bearing block, a cutter bar carried by the shoe, means for rotating the driven shaft in any angular position of the shoe, means for reciprocating the cutter bar from the driven shaft and comprising an actuating block secured to the cutter bar, a crank disc secured to the driven shaft, and a roller pin carried by the crank disc and engaging the slot of the actuating block, the shoe having a guide slot in which the lower end of the block is slidably fitted, the bracket of the shoe on which the trunnion is provided having a laterally extending guide overlying the guide slot and in which the upper end of the actuating block is slidably fitted.

JOHNATHAN H. WEBB.